Aug. 17, 1943.  O. W. HOSKING  2,326,998
TIRE VALVE
Filed July 23, 1940  2 Sheets-Sheet 1
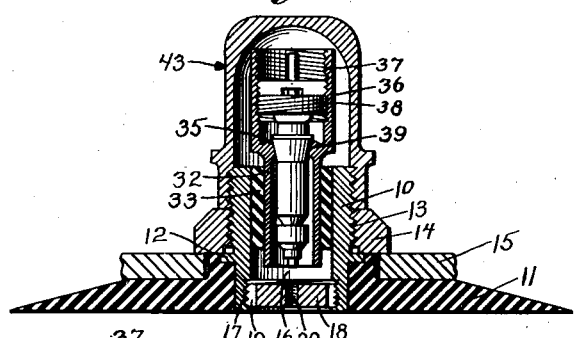
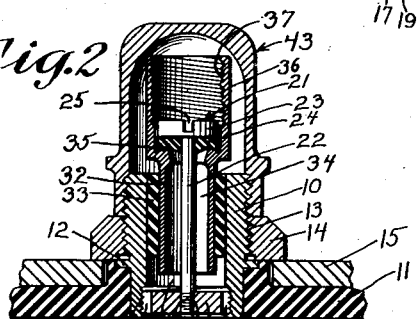
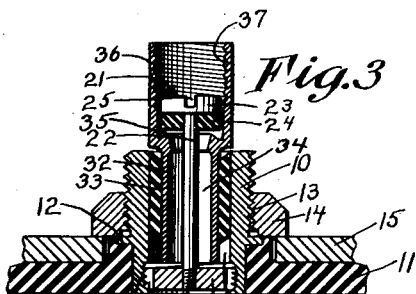
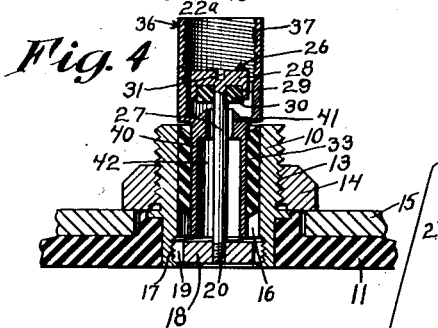
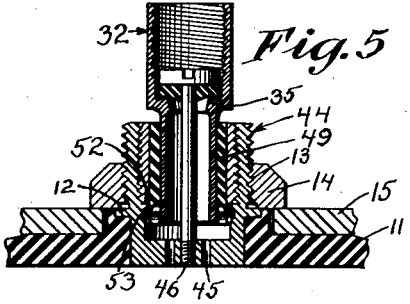
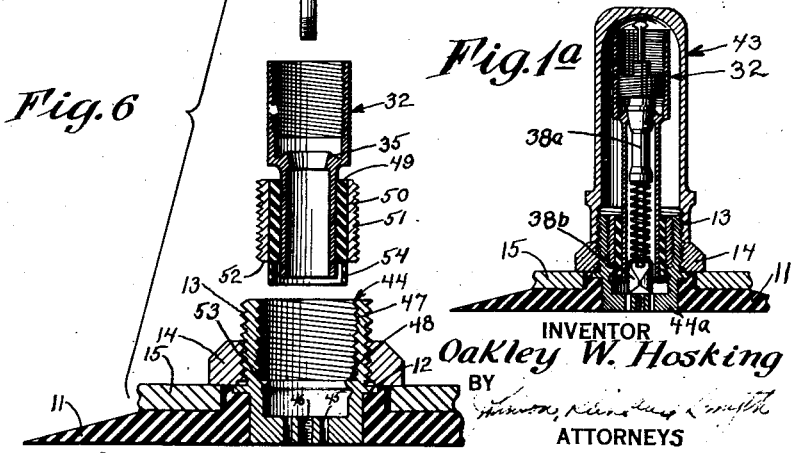
INVENTOR
Oakley W. Hosking
BY
ATTORNEYS Aug. 17, 1943.   O. W. HOSKING   2,326,998
TIRE VALVE
Filed July 23, 1940   2 Sheets-Sheet 2
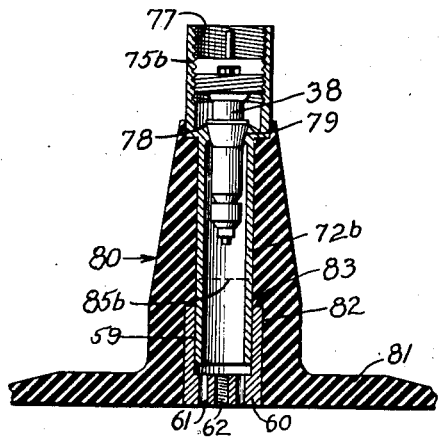
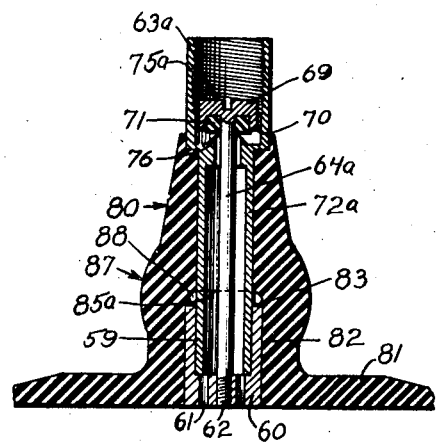
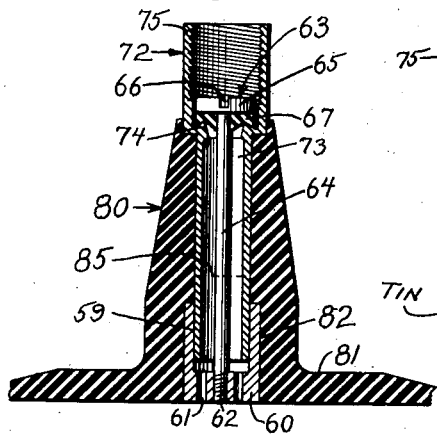
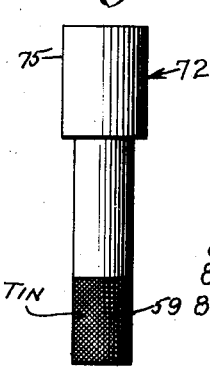
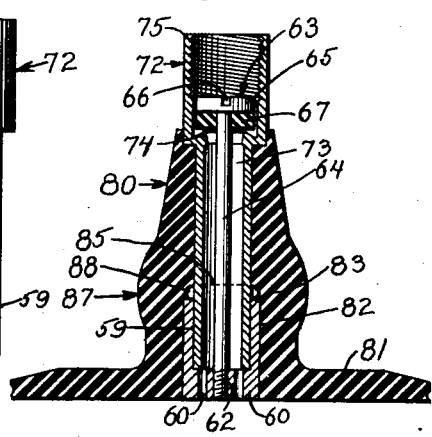
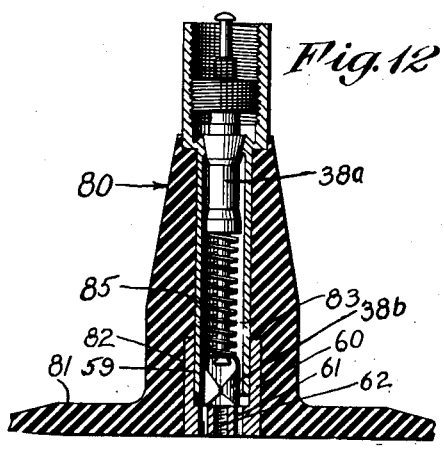
INVENTOR
Oakley W. Hosking
BY
ATTORNEYS Patented Aug. 17, 1943

2,326,998

UNITED STATES PATENT OFFICE 2,326,998

TIRE VALVE

Oakley W. Hosking, Monroe, N. Y., assignor to Composite Rubber Products Corporation, Bridgeport, Conn., a corporation of Connecticut Application July 23, 1940, Serial No. 346,926

17 Claims. (Cl. 251—144)

The present invention relates to a valve stem comprising a valve for use in conjunction with air containers, especially with inflatable articles, such as tires.

It is an object of the present invention to provide a valve stem of relatively simple, inexpensive, and rugged construction, having a minimum of movable parts which will not readily wear out, and which may be conveniently manufactured by rubber molding processes.

A further object of the present invention is to provide a valve stem, wherein the use of springs is unnecessary to effect closure of the valve.

Another object of the present invention is to provide a valve stem which is adapted to receive a valve insides or insert of the conventional type, to replace the special valve parts herein provided.

It is also an object to provide a valve stem which may be readily assembled without undue distortion of the parts thereof, and in which replacement of faulty parts may be readily effected.

It is a feature of the present invention that resilient rubber is provided as a means for effecting closure of the valve, whereby the necessity for the use of springs is eliminated. A further feature of one form of the invention is a construction, whereby the resilient rubber which effects valve closure, also forms the body of the valve stem. This construction simplifies the structure of the article.

In case of failure of the valve parts provided, a conventional valve insert may be used to replace the valve closure used in the present construction in emergencies.

Other features and advantages of the present invention will hereinafter appear.

The valve stem according to the present invention comprises, in its broader aspects, two metal parts forming the body of the stem, which are joined together in airtight relation and provided with connecting bores forming a passage for air to communicate with an air receiver to which the stem may be attached. The other end of the stem may be attached. The other end of the bore constitutes an orifice, whereby air may be admitted or released from the air receiver.

One of the said metal parts is provided with a valve closure, and the other with a valve seat within the air passage, adapted to register with said valve closure. A mass of resilient rubber is provided, joining said metal parts in such a manner that the valve closure is resiliently urged under pressure against the valve seat, thereby closing the passage through the connecting bores. The rubber mass permits resilient displacement of the metal parts with respect to each other, whereby the valve closure is removed from the valve seat and the passage through the bore is opened.

In one form of the invention, the metal parts engage each other in telescopic relation, and the resilient rubber mass is joined to them in the form of a covering or sheath, which constitutes the outer body of the valve stem, and provides means for attaching the stem to an air receiver. In another form of the invention, the metal parts are disposed in spaced relation with respect to each other and the resilient rubber which joins them is disposed within the intervening space. Means are preferably provided to permit removal of the valve closure for purposes of replacement, and, if desired, the metal parts may be so constructed that the part carrying the valve seat to which the resilient rubber is attached is also removable, whereby replacement of the valve seat is also made possible.

The bore of the orifice and valve seat of the stem may be so constructed as to receive a valve insides of the conventional type, so that in an emergency, upon failure of the valve closure to seat properly, the said closure may be removed and replaced by a conventional spring-operated valve insert.

Preferably the movable portions of the valve stem are protected in use by a rigid metal cover to avoid accidental opening of the valve by contact with external objects and to prevent access of dirt to the valve seat.

In the accompanying drawings which illustrate several forms of the valve stem according to the present invention, Figure 1 is a cross section of a valve stem, wherein the relatively movable metal parts are disposed in spaced relation with an intervening mass of rubber joining the parts together, and the bore is adapted to receive a valve insert of the conventional type which is shown in position.

Fig. 1A is a view similar to Fig. 1, showing the construction shown in Fig. 5, adapted to receive a long conventional valve insides.

Fig. 2 is a cross section of a valve stem similar to that shown in Fig. 1, but provided with a valve closure according to the present invention.

Fig. 3 is a cross section of the valve shown in Fig. 2, showing the position of the parts when the valve is opened to permit the passage of air through the stem.

Fig. 4 is a cross section similar to Fig. 3 of a valve stem showing a modification of the valve seat and valve closure, the parts being in position to permit the passage of air through the stem.

Fig. 5 is a cross section of another form of valve stem, broadly resembling the stem shown in Figs. 1, 2, and 3, but wherein the metal parts are constructed in such a manner that the valve seat and resilient rubber portion is removable for replacement.

Fig. 6 is a view in cross section of the separate parts of the valve stem shown in Fig. 5.

Fig. 7 is a cross section of a third form of a valve stem, wherein the metal parts are engaged in telescopic relation and enclosed by a resilient rubber sheath, and wherein the bore is adapted to receive a valve insert of the conventional type which is shown in position.

Fig. 8 is a cross section of a valve stem of the type shown in Fig. 7, showing one form of valve closure according to the present invention, the parts of the stem being in position to permit passage of air through the stem.

Fig. 9 is a cross section of a valve stem similar to that of Fig. 8, of telescopic construction, showing a variation of the valve closure, and the position of the parts when the valve is closed.

Fig. 10 is a view of the valve stem shown in Fig. 9 with the parts in their positions with the valve open.

Fig. 11 is an elevation of the insert used in the valve construction shown in Figs. 7 to 10, and indicates the portion 59 of the insert which is tinned or otherwise prepared so as not to adhere to the body of the stem when the rubber thereof is vulcanized about the insert.

Fig. 12 is a view similar to Fig. 7, but showing the relative proportions of the parts when the valve is constructed to take a long conventional valve insides.

In the embodiment of the invention illustrated in Figs. 1 to 4, the valve stem comprises a tubular metal base portion 10, the external surface of which is firmly secured at one end to a flange-like rubber base 11. The rubber flange provides a means for securing the valve stem to an air container such as the inner tube of a rubber tire to which the flange may be vulcanized. A shoulder 12 provides a support to reenforce the bond between the rubber flange and said metal base portion.

The projecting end of the metal base portion 10 is provided with external threads 13 which are adapted to engage a lock nut 14. By means of said lock nut, the base of the valve stem may be clamped to a suitable frame, for instance, a tire rim 15 having an opening through which the valve stem extends.

The bore 16 of said metal base portion 10 is threaded adjacent the lower end thereof, as shown at 17, in order to receive a correspondingly threaded metal plate 18. The said plate is provided with a plurality of cavities or indentations 19 at its edges, forming passages communicating with the bore 16 of the metal base portion 10, when the insert 18 is secured therein. The said plate is likewise provided with a central tapped hole 20 to receive one end of a valve closure.

Referring now to Figs. 2 and 3, the valve closure 21 comprises a stem 22 threaded at its lower end 22a, whereby it may be screwed into the tapped hole 20 of the metal plate 18, and rigidly held thereby. The upper end of the stem 22 carries a metal head 23. A layer of rubber 24 is adherently secured to the under surface of the head, to provide a seal for engaging a valve seat. A transverse slot 25 on the upper surface of the head 23 is adapted to be engaged by a screw driver or similar tool, in order to screw the stem 22 into the tapped hole 20 or to remove it therefrom.

In Fig. 4, a modified valve closure 26 is provided, having a stem 27 similar to the stem 22. The head 28 is provided around its lower edge with an annular flange 29 which forms an annular groove adjacent the stem 27. An annular rubber gasket 30 is inserted in the groove to provide a seal for engaging a valve seat. The said gasket may be held within said groove merely by friction, or if desired, it may be adherently bonded to the metal surface of the head 28, as in the case of the valve closure 21. A slot 31 on the upper surface of the head 28, similar to the slot 25 in the valve closure 21 shown in Figs. 2 and 3, is provided for removing or inserting the valve closure in the metal base portion 10.

A tubular metal member 32 is provided to carry the valve seat. One end thereof fits into the metal base portion 10 in spaced relation therewith. The other end protrudes beyond the said base portion forming an orifice for admitting or releasing air to or from the valve stem. Within the bore 34 of said tubular metal member, a shoulder 35 is provided forming a valve seat adapted to engage the rubber sealing layer 24 of the valve closure 21, to close the bore 34 against passage of air therethrough.

An annular layer of resilient rubber 33 is formed within the annular space separating the adjacent cylindrical inner surface of the base portion 10 and the outer surface of the tubular member 32. The said rubber layer is securely bonded to both metal surfaces, thus forming an effective seal against escape of air between the two metal parts, and holding the said parts firmly in their relative positions as shown in Fig. 2.

By virtue of its resiliency, the rubber layer 33 permits the tubular member 32 to be displaced axially with respect to the base portion 10, as shown in Fig. 3, by application of a compressive external force to its protruding end. The resilient rubber layer 33 normally urges the valve seat 35 under pressure against the rubber sealing layer 24 of the valve closure 21 as shown in Fig. 2 providing an effective seal against passage of air through the stem. When the insert 32 is depressed as shown in Fig. 3, by application of external force, the valve seat 35 is moved away from the valve closure 21, providing a passage for air through the connecting bores 34 and 16 of the insert 32 and base portion 10.

The protruding end of the metal insert 32 is preferably constructed of larger diameter than the lower portion thereof, and is extended in the form of a neck 36, providing an orifice for admitting or releasing air to or from the bore of the valve stem. The outer end of the neck 36 is preferably constructed to engage a chucking nozzle of the usual type.

The interior surface of the neck 36 is preferably provided with threads 37 adapted to engage corresponding threads on a valve insert 38 of the conventional type, and the bore 34 below the shoulder 35 is preferably provided with a tapered surface 39 adapted to engage a correspondingly tapered surface on a conventional valve insert as shown in Figs. 1 and 1A. Thus, upon failure of the valve closure 21 to effectively close the valve, for instance due to pitting of the valve seat 35 or the rubber seal 24, it may be removed by means of a screw driver or other suitable tool, and a conventional valve insert introduced to replace it. Figs. 1 and 1A respectively show conventional short and long valve inserts. The long valve insert 38a shown in Fig. 1A has its spring tensioning cup 38b engaged with the bottom of the cup shaped metal base 44a.

The rubber flange 11 is preferably secured by vulcanization to an air receiver, for instance, to the inner tube of a rubber tire. In order to admit air to an air receiver, for instance, to inflate a tire to which the valve stem is attached, a chucking nozzle from a source of compressed air is applied by pressing it against the protruding end of the neck 36. The latter is depressed, displacing the valve seat 35 from the rubber seal 24 of the valve closure 21, and air is admitted to the air receiver through the bore of the valve. When the chucking nozzle is removed, the rubber layer 33 urges the tubular member 32 upward, engaging the valve seat 35 with the valve closure 21, and forming a tight seal by means of the rubber layer 24.

In Fig. 4, the tubular metal insert carrying the valve seat is of slightly different construction in order to adapt it to form a secure contact with the rubber gasket 30 which is of somewhat smaller diameter than the rubber layer 24. The shoulder of valve seat 41 is constructed within the bore 42 of the tubular metal member 40 at a constriction of the said bore. The valve seat provided by the said shoulder is thus of relatively smaller diameter than the corresponding valve seat 35 in Figs. 1 to 3, whereby it is adapted to contact the gasket 30 along a line substantially equidistant from the edges of the contact surface of said gasket. In the valve stem shown in the said figure, no provision is made for receiving a conventional valve insert as shown in Figs 1 to 3. The exterior of the tubular metal member 40 and the manner in which it is secured to the metal base 10 is similar to that of the metal member 32 shown in Figs. 1, 2 and 3. The functioning of the valve stem for admitting or releasing air to or from an air receiver, such as a rubber tire to which the valve stem may be attached, is the same as that hereinbefore described.

Preferably, a metal cap 43 is provided, as shown in Figs. 1 and 2 which engages, at its lower end, the threads 13 on the outer surface of the tubular metal base portion 10. The cap is provided to protect the orifice of the valve stem against access of dirt, and to avoid the possibility of accidental displacement of the valve seat from the valve closure by contact of the protruding orifice with external objects.

In order to assemble the valve stem shown in Figs. 1 and 4, the metal plate 18 is screwed into position in the metal base portion 10. In order to retain it in place, the lower edges of the base 10 may be flanged over after it is positioned. The base of the valve stem is suitably secured to an air container such as a rubber tire rim tube. The valve closure 21 or 26 is then screwed into position engaging the valve seat 35 or 41. The assembled valve stem is now introduced into an aperture in a supporting frame such as a tire rim 15, and the lock nut 14 screwed into position clamping it securely against the said frame. The air receiver may then be inflated by means of a chucking device as described above, and after inflation of the air receiver, the cap 43 is screwed over the protruding end of the valve stem. Thus, no undue distortion of any rubber part, which might cause damage, is necessary to assemble the valve stem.

A modified form of the invention is shown in Figs. 5 and 6. The base portion of the valve stem comprises a cup-like metal base 44 which is secured to a rubber base or flange 11 in the same manner as the base portion 10 as described with reference to Figs. 1 to 4. The exterior of the base 44 is provided with threads which engage the lock nut 14 for clamping the base against the frame 15, such as an automobile tire rim through which the valve stem extends. The bottom of the cup-like base 44 is provided with holes 45 extending therethrough which provide access to the interior of said base portion. A central tapped hole 46 is likewise provided to receive a valve closure 21 identical with the valve closure shown in Figs. 1 to 3. The interior of the base portion 44 is provided with threads 47 extending partway downward from its upper edge and terminating in an annular shoulder 48. A cylindrical metal lining 50 is provided on its outer surface with threads 51 adapted to engage the inner threads 47 of the cup-like base 44. The lower edge 52 of the metal lining 50 is machined to provide an airtight seal upon engaging the shoulder 48, which is similarly machined.

A tubular metal member 32, identical with that shown in Figs. 2 and 3, extends into the bore of the lining 50, in spaced relation therewith, and an annular layer of resilient rubber 49 is interposed between the adjacent surfaces of said metal lining 50 and tubular member 32. The said resilient rubber layer is securely bonded to the said metal surfaces providing an effective seal against escape of air between the lining 50 and the member 32.

The said rubber layer normally urges the valve seat 35 against the rubber seal 24 of the valve closure, thereby closing the passage through the valve stem against passage of air, as shown in Fig. 5. However, when an external compressive force is applied to the protruding end of the tubular member 32 to depress it, the rubber layer 49 permits resilient displacement of the said member with respect to the base portion 44 and lining 50, removing the valve seat 35 from the rubber seal 24 of the valve closure 21, and allowing air to pass through the valve stem.

By provision of the threaded metal lining 50 which is removable from the cup-like base portion 44, the valve seat 35 and resilient rubber layer 49 are likewise removable and may be replaced if damaged in any way during use.

In order to assemble the portions of the valve stem as shown in Fig. 6, the base portion 44, which is secured to an air container by means of the rubber flange 11, is inserted into an aperture in a suitable frame, such as a tire rim 15, and the lock nut 14 screwed into position. The metal lining 50, which is integral with the rubber layer 49 and with the valve seat-carrying member 32, is screwed into position until the lower surface 52 of the metal lining engages the shoulder 48 and forms an airtight closure therewith. If desired, a layer of rubber cement, a gasket, or other sealing device may be applied to the surface 52 or shoulder 48 in order to insure an airtight seal. The valve closure 21 is then screwed into position and the assembled valve as shown in Fig. 5 is ready for use. Its operation is the same as that described for Figs. 1 to 3.

The tubular metal member 32 is preferably constructed as hereinbefore described to permit removal of the valve closure 21, and its replacement by a spring-operated valve insert of the conventional type.

If desired, a cap 43 as shown in Figs. 1 and 2 may be similarly applied to the valve stem. Likewise, if desired, the tubular metal member 40 and valve closure 20 as shown in Fig. 4 may be substituted in the construction of the valve stem of Figs. 5 and 6, for the tubular member 32 and the valve closure 21.

In order to prevent rapid escape of air if a leak develops at the junction between the metal lining 50 and the cup-like base portion 44, the resilient rubber layer 49 is extended below the edge 52 of the metal lining 50 in the form of a thin cylindrical flange 54. The interior diameter of the cup-like base portion 44 below the shoulder 48 is constructed the same as the outer diameter of said rubber flange 54, but is provided with an annular groove 53 surrounding said flange when the valve stem is assembled. Thus, the groove 53 forms an annular space which is more or less positively sealed by contact of the lower edge of the rubber flange 54 with the inner surface of the metal base 44 below said groove.

If a leak develops at the contact between the shoulder 48 and the metal lining 50, air escapes first from the annular groove 53. The internal pressure within the bore of the valve stem presses the rubber flange 54 against the walls of the groove 53, and thus provides a seal against the further escape of air.

If desired, the resilient rubber layer 49 may be extended in the form of a gasket covering the surface 52 of the metal lining 50 to insure a suitable airtight closure engaging the shoulder 48.

The various parts of the valve stem shown in Figs. 1 to 6 may be conveniently manufactured by molding processes. I have discovered that rubber articles which are prepared from rubber compounded to adhere to rubber-adherent metal surfaces, may be bonded directly to such surfaces subsequent to molding and vulcanization of the rubber by suitable application of heat and pressure to maintain intimate contact of the rubber with the metal surface.

Accordingly, the rubber flange 11 and the annular rubber layer 33 shown in Figs. 1 to 4 may be premolded and vulcanized in the usual manner using a rubber compound adapted to adhere to metal surfaces. The metal parts of the valve stem are constructed of a metal, such as brass or Monel metal, to which the rubber is adapted to be adhered.

The flange 11, the metal base portion 19, the annular rubber layer 33, and the tubular insert 32 are assembled in the positions shown in Figs. 1 or 2. The resulting article is enclosed in a mold adapted to confine at least the rubber portions thereof, and pressure and heat is applied until bonding of the rubber to the metal surfaces is effected.

Referring to Figs. 5 and 6, the premolded flange 11 is assembled with the cup-like base portion 44, and the resulting article enclosed within a mold adapted to confine the rubber. A bond is effected between the flange and the base as just described. Similarly the tubular rubber layer 49 is premolded and assembled with the metal lining 50 and the tubular insert 32 as shown in Fig. 6. The resulting article is confined in a mold and the rubber adhered to the metal surfaces by suitable application of heat and pressure.

The valve closure 21 may be similarly manufactured. The rubber sealing layer 24 is premolded, mounted upon the stem 22 in contact with the head 23, and bonded thereto by application of heat and pressure in a mold adapted to confine the rubber.

The rubber gasket 30 shown in Fig. 4 may be similarly premolded and mounted upon the metal portion of the valve closure 26. It may be held by a friction in the groove formed by the annular flange 29, but if desired, it may also be vulcanized to the metal surfaces in the same manner as valve closure 21. Thus, all parts of the valve stem shown in Figs. 1 to 6 may be conveniently and inexpensively produced.

Another form of the invention is shown in Figs. 7 to 10 inclusive. The valve stem comprises a cup-like base member 60 provided with holes 61 through the bottom which provide a passage for air communicating with the interior of the cup-like bore. A centrally located tapped hole 62 is adapted to receive a valve closure.

In Figs. 9 and 10, the valve closure 63 is fastened in the tapped hole 62 by means of the threaded end of the stem 64, which supports the valve closure. A head 65 is provided on the end of the stem 64, having a transverse slot 66 on its upper surface, whereby the valve closure may be conveniently screwed into the tapped hole 62, or removed therefrom as desired. A layer of rubber 67 is provided on the lower surface of the head 65 in order to form an airtight seal with a valve seat.

The valve seat is carried by a movable tubular metal member 72, the lower end of which fits telescopically into the cup-like base member 60. Within the bore 73 of the telescopic member 72, a shoulder 74 is formed which provides a valve seat adapted to engage the rubber layer 67 of the valve closure when the telescopic metal member is partly withdrawn from the cup-like base 60. The outer end 75 of the tubular member 72 is extended in the form of a neck, providing an air inlet-outlet orifice which is constructed of somewhat larger diameter than the rest of said member in order to permit convenient removal of the valve closure 63 when the valve stem is assembled and is shaped to engage a chucking nozzle of the conventional type.

In Fig. 8, a modification 63a of the valve closure is shown, differing from valve closure 63 of Figs. 9 and 10, in the construction of the head. The head 69 is provided with a flange 70 which forms an annular groove adjacent to the stem 64a. The rubber gasket 71 is inserted in the said groove and may be frictionally held in position as shown in Fig. 8.

The tubular metal member 72a of Fig. 8 is constructed somewhat differently from the tubular member 72 of Figs. 9 and 10, in order to provide a valve seat better adapted to engage the rubber gasket 71 of the modified valve closure shown in Fig. 8. The shoulder 76 is constructed of smaller diameter than the shoulder 74 shown in Fig. 9, in order to engage the gasket 71 along a line equidistant from the edges of the contact surface of said gasket whereby a more secure sealing contact is obtained. Otherwise, the construction of the telescopic metal part 72a is similar to that of the part 72 shown in Fig. 9.

In Fig. 7, the metal part 72b represents a modification of the tubular part 72 of Figs. 9 and 10, whereby the valve seat is adapted to receive a valve insert 38 of the conventional type. The outer neck-like extension 75b of the telescopic member 72b is provided with interior threads 77 adapted to engage corresponding threads on a conventional valve insert 38 as shown, and the shoulder or valve seat 78 is provided with a tapered surface 79 to engage a similar conical surface on said conventional valve insert. Thus, when the valve closure 63, which is adapted to engage the valve seat 78 of Fig. 7 in the same manner as the valve seat 74 of Fig. 9, is removed, a conventional spring-operated valve insert 38 may be substituted therefor, and will perform its function in the usual manner.

In each of the valve stems shown in Figs. 7 to 10 inclusive, a rubber covering or sheath 80 forms the outer body of the valve stem. The covering 80 terminates in a flange 81, whereby the valve stem may be secured to an air container, such as a rubber tire inner tube. The rubber covering 80 is integrally bonded to the outer cylindrical surface 82 of the cup-like base portion 60 and to its upper edges 83, and is similarly bonded to the outer surface of the metal members 72, 72a, or 72b from the dotted lines 85, 85a, or 85b to the upper extremity of the rubber covering 80. Thus the said covering seals the valve stem against escape of air between the telescoping metal parts thereof.

Below the dotted line 85 (or 85a, or 85b), the said rubber covering is free from the surface of the aforesaid telescopic metal members. The rubber covering 80 normally holds the valve seat 73, 76, or 78 against the corresponding rubber layer 67 or gasket 71 of the valve closure. The normal position is shown, for instance, in Fig. 9. However, when pressure is applied to the outer end of the telescopic metal parts 72 or 72a, as for instance upon application of a chucking nozzle thereto, the said parts are depressed into the cup-like base member 60, displacing the valve seat from the rubber seal of the valve closure as shown in Figs. 8 and 10, and permitting passage of air through the valve stem. The rubber covering 80 bulges resiliently as shown at 87, and the portion which is free from the surface of the tubular metal member 72, 72a, or 72b below the dotted line 85, 85a or 85b curls from the said metal surface as shown at 88. When the pressure is released, the resiliency of the rubber again forces the valve seat against the valve closure, closing the valve against further passage of air.

In order to manufacture the valve stem shown in Figs. 7 to 10 inclusive by molding processes, the rubber is compounded to render it adherent to rubber-adherent metal surfaces. The sheath or covering 80 with the flange 81 is premolded and vulcanized in the desired shape as shown. The metal parts to which the rubber is to be adhered are made of a metal to which the rubber will adhere, such as brass or Monel metal. In order to prevent adherence of the rubber to the lower end of the metal member 72, 72a or 72b, the lower end 59 thereof below the dotted line 85, 85a or 85b is provided with a coating of a metal to which rubber will not adhere, for instance, tin. The said parts are then assembled as shown in Figs. 7 or 9, omitting the valve closure or insert, and the resulting article is introduced into a mold which is adapted to confine the rubber and maintain intimate contact of the rubber with the metal surfaces. Sufficient heat and pressure is then applied to cause the rubber to bond to the metal surfaces.

The valve closures may be similarly manufactured, as hereinbefore described with reference to Figs. 1 to 6, and subsequently screwed into the tapped hole 62 of the metal base member 60.

In the construction shown in Fig. 12, the spring-compressing cup 38b at the lower end of the long valve insides 38a bears upon the bottom portion of the metal insert 60 molded in the base portion of the valve stem 80.

Variations and modifications may be made within the scope of this invention and portions of the improvements may be used without others.

I claim:

1. A valve stem comprising a metal base member, and a relatively movable metal orifice member joined to said base member in airtight relation, said members having connecting bores providing a passage for air through said stem, one end of said passage being adapted to communicate with an air receiver and the other end providing an orifice for admitting or releasing air; a removable valve closure carried by said base member; a valve seat formed within the bore of said movable orifice member adapted to register with said valve closure to close the passage through the valve stem against passage of air therethrough; an internally threaded neck-like extension of said orifice member forming an air inlet-outlet orifice, and a tapered portion within the bore of said member, said threaded extension and tapered bore surface being adapted to receive a conventional spring-operated valve insert when the valve closure is removed; and a mass of resilient rubber united to both of said metal members normally urging said valve closure under pressure against said valve seat to close the bore against passage of air therethrough, and permitting resilient relative displacement of said metal members to remove the valve closure from the valve seat and permit passage of air through the bore.

2. A valve stem comprising a metal base member carrying a valve closure and having a bore providing a passage for air through said member; a removable metal lining for said bore; means for retaining said lining in airtight relation with said metal base portion; a tubular metal orifice member having a bore connected with the bore of the base portion to form a passage for air through the valve stem, and carrying within its bore a valve seat adapted to register with the valve closure carried by the base member, said tubular metal member fitting into said metal lining in spaced relation therewith; and a resilient body of rubber filling the space between said metal lining and said tubular orifice member, integrally bonded to the metal surfaces thereof to form an airtight seal between said lining and said member, normally urging said valve seat resiliently against the valve closure to close the passage through the valve stem against escape of air therethrough, and permitting resilient displacement of the tubular member with respect to the base member and lining, whereby the valve closure is removed from the valve seat to permit passage of air through the connecting bores of the base member and tubular metal orifice member.

3. A valve stem comprising a metal base member carrying a valve closure, and having a bore providing a passage for air therethrough; a removable metal lining for said bore; means for retaining said lining within said metal base portion; a tubular metal orifice member having a bore connected with the bore of the base portion to form a passage for air through the valve stem, and carrying within its bore a valve seat adapted to register with the valve closure carried by the base member, said tubular metal member fitting into said metal lining in spaced relation therewith; and a resilient body of rubber filling the space between said metal lining and said tubular member, integrally bonded to the metal surfaces thereof to form an airtight seal between them, and also forming a seal against escape of air between said lining and said metal base member; said rubber normally urging the valve seat against the valve closure to close the air passage through the valve stem, and permitting resilient displacement of the tubular member with respect to said base member and lining, whereby the valve closure is removed from the valve seat to permit a passage of air through the connecting bores of the base member and tubular metal member.

4. A valve stem comprising a metal base member carrying a removable valve closure and having a bore providing a passage for air therethrough; a tubular metal orifice member having a bore connected with that of the said base member, and carrying a valve seat within said bore adapted to register with the valve closure carried by the base member, said tubular metal member fitting into the said base member in spaced relation therewith; an internally threaded necklike extension on the end of said tubular metal member forming an inlet-outlet orifice for air at the end of said stem, and a tapered portion within the bore of said member, the threaded extension and tapered surface being adapted to receive a spring-operated valve insert of the conventional type when the valve closure is removed, and a resilient body of rubber filling the space between said base member and said tubular member, integrally bonded to the metal surfaces thereof to form an airtight seal between them, normally urging said valve seat against said valve closure to close the air passage, and permitting resilient displacement of the tubular member with respect to said base member, whereby the valve closure is removed from the valve seat to permit passage of air through the connecting bores of said base member and tubular member.

5. A valve stem comprising a metal base member carrying a removable valve closure, and having a bore providing a passage for air therethrough; a removable metal lining for said bore; means for retaining said lining in airtight relation with said metal base member; a movable tubular metal orifice member having a bore connected with that of the base member, carrying a valve seat within its bore adapted to register with the valve closure carried by the base member, said tubular member fitting into said metal lining in spaced relation therewith; an internally threaded neck-like extension of said tubular orifice member forming an air inlet-outlet orifice, and a tapered portion within the bore of said member, said threaded extension and tapered surface being adapted to receive a conventional spring-operated valve insert when the valve closure is removed; and a mass of resilient rubber filling the space between said metal lining and said tubular member, integrally bonded to the metal surfaces thereof to form an airtight seal between them, normally urging said valve seat against said valve closure to close the passage through the valve stem, and permitting resilient displacement of the tubular member with respect to said base member and lining, whereby the valve closure is removed from the valve seat to permit passage of air through the connecting bores of the base member and tubular metal member.

6. A valve stem comprising a body having two relatively movable metal parts, one part fitting telescopically into the other, joined together in airtight relation by a surrounding layer of resilient rubber secured at each end respectively to the two metal parts; connecting bores through said metal parts, forming a passage for air through the valve stem, one end of said passage being adapted to communicate with an air receiver to which the valve stem is attachable, and the other end providing an orifice for admitting or releasing air; an internally threaded neck-like extension of one of the metal parts forming an orifice for said passage, and a tapered portion within the bore of said member, said threaded extension and tapered bore surface being adapted to receive a conventional spring-operated valve insert; a valve seat formed within said bore carried by one of said movable metal parts; a removable valve closure adapted to register with said valve seat carried by the other movable metal part; said resilient rubber layer normally urging the valve closure under pressure against the valve seat to close the bore against passage of air therethrough and permitting relative displacement of the metal parts to remove said valve closure from the valve seat, and permit passage of air through the bore, said rubber also sealing the two metal parts against escape of air at their telescopic junction.

7. In combination with a valve stem as claimed in claim 2, a metal cap removably secured to the metal base member and enclosing the tubular metal member, whereby the latter is protected against accidental displacement which would remove the valve seat from the valve closure and permit escape of air through the valve stem.

8. A valve stem comprising a pair of relatively movable concentrically mounted rigid tubular members, the end of one member extending beyond the other member to form an inlet-outlet orifice at the tip of the stem, the bore of the inner member forming a passage through said stem; means for securing the other member to an inflatable air container with the base end of said passage communicating with the container; a resilient tubular mass of rubber intermediate said members and united to the adjacent surfaces thereof to form a seal against escape of air through the annular passage between said members; a perforated transverse wall intermediate the ends of said inner member; a valve seat carried by said wall; and a valve closure carried within said passage by the other member adapted to cooperate with said seat, outward movement of said orifice-forming member from the other member seating said valve closure against the valve seat to close the passage against flow of air therethrough and inward movement of said orifice-forming member unseating the valve closure to open said passage, said resilient mass of rubber normally urging said orifice-forming member outward from the base of the stem to close the passage and yielding to inward pressure applied to the orifice member to permit inward motion.

9. In a valve stem as defined in claim 8, a rigid cap enclosing the tip of said orifice-forming member and removably secured to the base of the stem to prevent accidental displacement of the orifice member which would unseat the valve closure from the valve seat.

10. A valve stem comprising a pair of relatively movable rigid members having coaligned communicating bores forming a passage through the stem from base to tip, the end of one member extending beyond the other member to form an inlet-outlet orifice at the tip of the stem; means for securing the other member to an inflatable air container with the base end of said passage communicating therewith; a resilient annular mass of rubber united to both of said members to form a seal against escape of air from said passage between said members; an annular valve seat carried by said orifice-forming member within its bore, and facing the tip of the stem; and a valve closure within said passage removably secured to the other member, outward movement of said orifice-forming member from the other member seating said valve seat against the valve closure to close the passage, and inward movement of the orifice-forming member unseating the valve closure from the valve seat to open the passage, said resilient mass of rubber normally urging said orifice forming member outward to close the passage and yielding to inward pressure applied to the orifice member to permit inward motion thereof for opening the passage, the bore of said orifice-forming member between said valve seat and said orifice being of sufficient size to permit removal of said valve closure through the tip of the stem.

11. A valve stem comprising a pair of relatively movable rigid members having coaligned communicating bores forming a passage through the stem from base to tip, the end of one member extending beyond the other member to form an inlet-outlet orifice at the tip of the stem; means for securing the other member to an inflatable air container with the base end of said passage communicating therewith; a resilient annular mass of rubber united to both of said members to form a seal against escape of air from said passage between said members; an annular valve seat carried by one of said members within its bore; a valve closure within said passage removably secured to the other member, said valve closure being removable from said passage through the tip of the stem; axial movement of said orifice-forming member relative to the other member in one direction seating said valve seat against the valve closure to close the passage, and axial movement of the orifice-forming member in the opposite direction unseating the valve closure from the valve seat to open the passage, said resilient mass of rubber and fluid pressure in the base end of the passage normally urging said orifice-forming member in the direction to close the passage and yielding to external force applied to the orifice member in the opposite direction to permit motion thereof for opening the passage; and means in the bore of said orifice-forming member for receiving and retaining therein when the said removable valve closure is removed, a valve core of the conventional type having a tubular barrel with means for engaging the walls of the bore in airtight relation, a valve seat on the barrel, and a valve member adapted to cooperate with the valve seat for closing the barrel against escape of air therethrough.

12. A valve stem comprising a pair of relatively removably united rigid members having coaligned communicating bores forming a passage through the stem from base to tip, the end of one member extending beyond the other member to form an inlet-outlet orifice at the tip of the stem; means for securing the other member to an inflatable air container with the base end of said passage communicating therewith; a resilient annular mass of rubber united to both of said members to form a seal against escape of air from said passage between said members; an annular valve seat within the bore of said orifice-forming member and facing the tip of the stem; and a valve closure within said passage removably secured to the other member, outward movement of said orifice-forming member from the other member seating said valve closure against the valve seat to close the passage, and inward movement of the orifice-forming member unseating the valve closure from the valve seat to open the passage, said resilient mass of rubber normally urging said orifice-forming member outward to close the passage and yielding to inward pressure applied to the orifice member to permit inward motion thereof for opening the passage, the bore of said orifice-forming member between said valve seat and said orifice being of sufficient size to permit removal of said valve closure from the tip of the stem.

13. A valve stem comprising a pair of mutually telescoped, relatively slidable, rigid, tubular members having coaligned communicating bores forming a passage through the stem from base to tip, the end of one member extending beyond the other forming an inlet-outlet orifice at the tip of the stem; means for securing the other member to an inflatable air container with the base end of the passage communicating with the container; a resilient mass of rubber annularly united to the telescoped end of one member and similarly united to the surface of the other member at a distance from said end of the former member to seal the junction of said members against escape of air from the passage to the exterior of the stem, the rubber between said annularly united portion normally holding said members yieldably in predetermined longitudinal relation and being free to flex away from said members to permit inward telescopic sliding movement of said orifice member toward the other member; an annular valve seat within the bore of said orifice-forming member, facing the tip of the stem; and a valve closure within said passage removably secured to the other member, outward movement of said orifice-forming member from the other member seating said valve closure against the valve seat to close the passage, and inward movement of the orifice-forming member unseating the valve closure from the valve seat to open the passage; said freely flexible portion of the rubber normally urging said orifice-forming member outward to close the passage and flexing yieldably in response to inward pressure applied to the orifice member to permit inward motion of said orifice member to open the passage.

14. A valve stem for an inflatable air container comprising a pair of relatively movable concentrically mounted tubular members, the inner of said members having an orifice formed in the bore thereof; a valve seat at said orifice; a valve carried by the other of said members adapted to engage said seat and close said orifice; means for securing the base of the valve-carrying member to a wall of an inflatable air container with the bore of said inner member in alignment with an opening formed in said wall; and a tubular resilient means coaxially mounted intermediate said members and secured to the adjacent surfaces thereof, said means filling and sealing the annular passage intermediate said members and normally holding the same in a position wherein said valve is held in engagement with said seat and the orifice closed, said inner member being movable inward by an application of force to displace said valve to open said orifice.

15. A valve stem for an inflatable air container comprising a pair of relatively movable concentrically mounted tubular members, the inner of said members having an orifice formed in the bore thereof; a valve seat at said orifice; a reticulated member transversely secured in the bore of the outer member; a rigid stem removably secured to said reticulated member and extending through the bore of said inner member and the orifice formed therein; a valve carried by said stem and adapted to engage said seat to close said orifice; a tubular resilient means coaxially mounted intermediate said members and secured to the adjacent surfaces thereof, said means filling and sealing the annular passage intermediate said members and normally holding the same in a position wherein said seat is held against said valve and the orifice closed, said means yielding inwardly upon an application of force applied to said inner member whereby said valve is displaced from said seat to open said orifice; and means for securing the base of said valve-carrying member to a wall of an inflatable air container with the bore of said inner member in alignment with an opening formed in said wall.

16. A valve stem comprising a pair of relatively movable rigid tubular members having coaligned communicating bores forming a passage through the stem from base to tip, the end of one member extending beyond the other member to form an inlet-outlet orifice at the tip of the stem; means for securing the base of the other member to an inflatable air container with said passage communicating with an opening formed therein; a resilient annular mass of rubber intermediate said members and united to the adjacent surfaces thereof to form a seal against escape of air through the annular space between said members; an annular valve seat in the bore of said orifice-forming member facing the tip of the stem; a spider transversely secured in said passage; a rigid stem removably secured to said spider and coaxially extending through said passage to a point beyond said valve seat; and a valve carried by the free end of said stem and adapted to cooperate with said valve seat, outward movement of said orifice-forming member relative to the other member moving said valve seat against the valve and closing the passage against the flow of air, inward movement of said orifice-forming member displacing the valve seat from the valve and opening said passage, said resilient mass of rubber normally urging said orifice-forming member outward relative to said other member to close the passage and yielding to inward pressure applied to the orifice-forming member to permit inward movement thereof for opening said passage.

17. A valve stem for an inflatable air container comprising a tubular base member having a perforated transverse wall; means secured to said base member adjacent the closed end for securing the same to the wall of the inflatable member with the perforations of the end wall coinciding with an opening formed in said wall; a pair of relatively movable concentrically mounted rigid tubular members; a tubular resilient means coaxially mounted intermediate said members and secured to the adjacent surface thereof, said means filling and sealing the annular passage intermediate said members, said so united members being removably secured within the open end of said first-named tubular member; a rigid pin removably secured to said perforated wall and coaxially extending through the passage formed by the bore of the innermost tubular member; a valve seat formed in the bore of said innermost member; and a valve carried by the free end of said pin and adapted to engage said seat to close the passage formed by the bore of said innermost member, said resilient means normally holding the valve seat tightly pressed against the valve, said resilient means permitting movement of said innermost member upon an application of inward force applied thereto whereby said seat is moved away from said valve and the passage opened, said pin and the valve carried thereby being removable for substitution of a conventional spring operated valve insert.

OAKLEY W. HOSKING.